Patented Oct. 11, 1932                                         1,881,435

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

ADHERING FABRICS (No Drawing.   Application filed September 6, 1921.   Serial No. 498,861.

The object of this invention is to provide an improved method of causing sheets, pieces or objects of felt waterproofing material, or other fabrics, or materials for other purposes, to adhere one to the other, or to surfaces suitably prepared to receive them, by the mere act of bringing together the surfaces desired to be adhered; also to provide suitable substances for use in preparing the surfaces for adhesion or for introduction between the surfaces so that they will be caused to adhere in accordance with such methods also to produce such sheets, pieces, or other objects of fabric, in form suitable for various commercial purposes, with such substances applied to them in a manner that will cause them to adhere when assembled or applied in the manner for which they are intended.

The invention proceeds upon the principle of applying to a surface or surfaces which are to be adhered, or introducing between two such surfaces a substance which will react upon the material or surfacing, opposed to it, and draw from the latter an element or ingredient that will convert the applied substance into a condition which will cause it to serve as an adhesive. For example, upon the surface of material which is to be adhered, or between such surface and that of another surface to which it is to be united, is placed a jelly-like substance of an absorptive nature which will act upon asphaltic, bituminous or other like surfacing, or impregnating materials in waterproof fabric, and cause transfusion of an ingredient of such material into the jelly-like substance thereby converting the latter into the desired adhesive and causing it to unite the surfaces that are brought together. Waterproofing substance which is carried by one member of the union, is preferably caused to act upon the jelly-like substance with the effect of stiffening and toughening contacting surfaces, thus causing adhesion and finally binding together, and in order that the jelly-like substance will be adapted to induce this transfusion, it has incorporated in it a solvent which slowly dissolves the bituminous or other ingredient of the surfacing or impregnating material and reduces it to a condition in which it will be absorbed by the jelly-like substance.

However, it is not the intention to limit the scope of this invention to transfusion, but two like substances may be placed in contact as, for instance, two jellylike substances, one containing the solvent, the other being a jellylike substance containing in its composition bituminous or other material which does not contain the solvent but which may impart to the jellylike substance with which it comes in contact some of its body structure by reason of the solvent carrying jellylike substances.

For convenience, it is well to divide these substances into various groups.

Group "A" represents that class of jellylike substances which constitute a metal soap which has a jellylike nature but still retains the adhesive qualities. This may be termed the base of the jellylike substances in question. Such base may be prepared by saponifying certain oils and after the oils are saponified, precipitated in a solution containing a metal salt, then washing the jellylike substances to eliminate all surplus precipitate and chemicals to neutralize the soap.

One way of producing this jelly-like substance would be to mix castor oil and caustic soda and add thereto aluminum sulphate as a metal salt.

Group "B" will be considered as consisting of metal soaps obtained as described with reference to Group "A" and treated with turpentine or other like volatile liquids which have a solvent action on bituminous material, which solvent is taken up by the jellylike substance and helps to set it more firmly and give to it a more transparent body.

Group "C" consists of such metal soaps as derived according to the method explained with reference to Group "A" and which have been treated with solvents, such as turpentine, as indicated in "B", but which have had added to them such substances as silicate of soda, resin, solvent oils, and the like, which gives them more of an adhesive body but which still retains the jellylike nature.

Group "D" consists of one of the metallic bases which has added to it solvent oils such as rosin oil, fusel oil and the like, and resin and an oil treated with one of the metal chlorides such as zinc chloride which imparts a more stringy nature and makes the jellylike substances very flexible and rubbery.

Group "E" consists of a metal soap base in which the solvent oils have been omitted, but which are compounded with a bituminous or other body substance such as 240° melt point blown asphalt in a plastic state which does not destroy the jellylike consistency of the soap but imparts a firmer body yet retains its jellylike nature.

Group "F" consists of a metal soap base of a jellylike nature yet adhesive and stringy, which has had added to it a fat, such as tallow, resin, a solvent such as fusel oil and wood flour.

Group "G" consists of Group "C" incorporated in an oil, fat, gum or wax, giving firmness to the body and stopping the tendency to flow. Beeswax may be used for the gum or wax in this group.

The following formula will produce the metal soap base: It consists of castor oil treated with approximately fifteen per cent by weight of caustic soda, and then precipitated in a mixture of heated water, plus a metal chloride. The degree of the jellylike nature may be regulated by the length of heating and by the varying amounts of caustic soda or other suitable alkali. Further treatment of this jellylike substance is noted in the various group forms, all of which embodiments give various results and consistencies.

I claim:

1. The herein described method of adhering sheet material to a surface, which consists in providing upon the sheet material or surface an asphalt absorbent substance and upon the other a substance containing an ingredient adapted to be transfused into the asphalt absorbent substance, with reaction upon the latter that converts it into an adhesive, and bringing said sheet material and surface together with their said substances in contact.

2. The herein described method of adhering to a surface a material containing a waterproofing substance which includes an ingredient adapted to be transfused, and introducing between said surface and material an absorbent substance adapted to react upon said waterproofing substance and cause transfusion of the aforesaid ingredient into the absorbent substance.

3. The method of adhering material to a surface, which consists in providing upon the material a substance containing a transfusible ingredient and upon the surface a jellylike absorbent substance having a solvent incorporated therein which is capable of dissolving the said ingredient and conveying it into the absorbent substance, and then applying the material to the surface with their said substances in contact.

4. The described method of adhering material to a surface which consists in providing the surface with an asphaltic or bituminous substance and providing between the surface and the material a jelly-like substance adapted to react upon the asphaltic or bituminous substance and cause transfusion of the same into the jelly-like substance, with conversion of the latter into an adhesive.

5. The method of joining waterproofing sheets characterized by applying to one of said sheets a normally non-adhesive, jellylike composition composed of a metallic soap and a liquid which has a solvent action on the waterproofing sheet to render same adhesive and contacting a second sheet therewith.

6. A covering sheet comprising a bituminized foundation sheet and a cementing layer, the cementing layer being a normally non-adhesive, jelly-like composition which has the quality of becoming adhesive in contact with a bituminous substance.

7. A covering sheet comprising a bituminized foundation sheet and a cementing layer, the cementing layer being a normally non-adhesive, jelly-like composition composed of a metallic soap and a liquid which has the quality of becoming adhesive in contact with a bituminous substance.

8. A covering sheet comprising a bituminized foundation sheet and a cementing layer, the cementing layer being a normally non-adhesive, jelly-like composition composed of a metallic soap and an oil which has the quality of becoming adhesive in contact with a bituminous substance.

9. A roof covering, comprising a layer of waterproofed sheets adhesively joined by a layer of normally non-adhesive, jelly-like composition composed of a metallic soap and liquid which is rendered adhesive by said sheets to bond them together.

10. A roof covering, comprising a layer of waterproofed sheets adhesively joined by a layer of normally non-adhesive, jelly-like composition composed of a metallic soap and oil which is rendered adhesive by said sheets to bond them together.

In witness whereof I have hereunto signed my name.

ALBERT C. FISCHER.